US012337456B2

(12) United States Patent
Osawa (10) Patent No.: US 12,337,456 B2
(45) Date of Patent: *Jun. 24, 2025

(54) POWER WORKING MACHINE

(71) Applicant: YAMABIKO CORPORATION, Tokyo (JP)

(72) Inventor: Hisato Osawa, Tokyo (JP)

(73) Assignee: YAMABIKO CORPORATION (JP)

( * ) Notice: Subject to any disclaimer, the term of this patent is extended or adjusted under 35 U.S.C. 154(b) by 263 days.

This patent is subject to a terminal disclaimer.

(21) Appl. No.: 18/151,511

(22) Filed: Jan. 9, 2023

(65) Prior Publication Data

US 2023/0226679 A1    Jul. 20, 2023

(30) Foreign Application Priority Data

Jan. 20, 2022 (JP) ................................ 2022-006797

(51) Int. Cl.
*B25F 5/00* (2006.01)
*H02K 5/20* (2006.01)
(Continued)

(52) U.S. Cl.
CPC ............. *B25F 5/008* (2013.01); *H02K 5/207* (2021.01); *H02K 7/145* (2013.01); *H02K 9/06* (2013.01); *H02K 9/26* (2013.01); *B27B 17/08* (2013.01)

(58) Field of Classification Search
CPC ........ B25F 5/008; H02K 5/207; H02K 7/145; H02K 9/06; H02K 9/26; B27B 17/08; B27B 17/00
(Continued)

(56) References Cited

U.S. PATENT DOCUMENTS 2,779,883 A * 1/1957 Schumann ............. H02K 7/145
310/90
3,878,809 A * 4/1975 Ray ......................... H02K 9/06
440/6
(Continued)

FOREIGN PATENT DOCUMENTS

DE            3023628 C2 * 3/1992
DE    202013100084 U1 * 5/2013 ............. A01G 3/086
(Continued)

OTHER PUBLICATIONS

European Search Report issued in the corresponding European Application No. 22216956.7; dated May 24, 2023 (total 10 pages).
(Continued)

*Primary Examiner* — Robert F Long
(74) *Attorney, Agent, or Firm* — Harness, Dickey & Pierce, P.L.C.

(57) ABSTRACT

A power working machine comprises a working portion, a driving portion, a main body portion, and a blowing portion. The working portion is configured to act on a work object. The driving portion is configured to drive the working portion. The main body portion includes a bottom surface portion, an intake port, and an exhaust port, and is configured to form a storage space for storing the driving portion and an airflow path leading from the intake port to the exhaust port through the storage space. The blowing portion is configured to generate an airflow in the airflow path toward the exhaust port. The intake port is configured to open in a direction having a vertical downward component in a first state in which the power working machine is placed with the bottom surface portion facing a horizontal surface.

8 Claims, 9 Drawing Sheets

(51) Int. Cl.
  *H02K 7/14*  (2006.01)
  *H02K 9/06*  (2006.01)
  *H02K 9/26*  (2006.01)
  *B27B 17/08* (2006.01)

(58) Field of Classification Search
  USPC ........ 173/197, 81, 90, 200, 140–141, 162.1, 173/213, 217, 168–171
  See application file for complete search history.

(56) References Cited

U.S. PATENT DOCUMENTS

| | | | | |
|---|---|---|---|---|
| 4,730,397 | A * | 3/1988 | Weiford | B23D 51/02 30/392 |
| 5,419,737 | A * | 5/1995 | Brazell | B24B 55/10 451/357 |
| 6,025,662 | A * | 2/2000 | Nakane | H02K 9/28 239/248 |
| 6,127,751 | A * | 10/2000 | Kristen | B25D 17/20 173/117 |
| 6,295,953 | B1 * | 10/2001 | Ohsawa | F02M 35/04 123/437 |
| 6,443,675 | B1 * | 9/2002 | Kopras | B25F 5/026 409/137 |
| 6,543,549 | B1 * | 4/2003 | Riedl | B25F 5/02 173/171 |
| 7,252,581 | B2 * | 8/2007 | Numata | B25F 5/02 15/230.1 |
| 7,308,950 | B2 * | 12/2007 | Faatz | B25F 5/008 173/171 |
| 9,009,982 | B1 * | 4/2015 | Sedgwick | B23D 45/003 30/388 |
| 9,494,120 | B2 * | 11/2016 | Naganuma | F02M 69/00 |
| 10,836,019 | B2 * | 11/2020 | Matsushita | B25F 5/008 |
| 11,944,238 | B2 * | 4/2024 | Seok | A47J 43/07 |
| 2002/0034682 | A1 * | 3/2002 | Moores, Jr. | H02J 7/0044 429/71 |
| 2004/0124721 | A1 * | 7/2004 | Pfisterer | H02K 11/33 310/58 |
| 2005/0188926 | A1 * | 9/2005 | Kimura | B60R 13/0861 123/41.7 |
| 2005/0246905 | A1 * | 11/2005 | Tozawa | B23D 51/00 30/392 |
| 2005/0247463 | A1 * | 11/2005 | Wuensch | B23Q 11/0046 173/217 |
| 2006/0081386 | A1 * | 4/2006 | Zhang | B25B 21/00 173/2 |
| 2006/0091159 | A1 * | 5/2006 | Shew | F16N 11/08 222/256 |
| 2006/0175915 | A1 * | 8/2006 | Voigt | F04D 29/281 310/58 |
| 2008/0106159 | A1 * | 5/2008 | Yoshida | A01G 3/088 310/64 |
| 2009/0245958 | A1 * | 10/2009 | Lau | B25F 5/008 173/217 |
| 2010/0218385 | A1 * | 9/2010 | Mang | B25F 5/008 30/298 |
| 2011/0036610 | A1 * | 2/2011 | Vollmer | B25F 5/008 173/217 |
| 2011/0147030 | A1 * | 6/2011 | Blum | B25F 5/008 173/217 |
| 2011/0227430 | A1 * | 9/2011 | Omori | H02K 11/33 310/50 |
| 2011/0308828 | A1 * | 12/2011 | Shinma | B25F 5/008 173/114 |
| 2013/0014967 | A1 * | 1/2013 | Ito | B25F 5/00 173/93 |
| 2013/0291810 | A1 * | 11/2013 | Nishikawa | B23D 59/006 123/2 |
| 2013/0318799 | A1 * | 12/2013 | Kato | A01G 3/053 30/216 |
| 2014/0144663 | A1 * | 5/2014 | Fuchs | B25F 5/02 173/217 |
| 2014/0265664 | A1 * | 9/2014 | Camilleri | H02K 9/06 310/59 |
| 2015/0263592 | A1 * | 9/2015 | Kawakami | B25F 5/008 451/359 |
| 2016/0079824 | A1 * | 3/2016 | McKinzie | H02K 5/207 310/58 |
| 2016/0265491 | A1 * | 9/2016 | Kawamura | F02M 35/06 |
| 2017/0246732 | A1 * | 8/2017 | Dey, IV | B25B 23/1475 |
| 2017/0326718 | A1 * | 11/2017 | Meixner | B25F 5/008 |
| 2018/0056497 | A1 * | 3/2018 | Chen | B24B 23/02 |
| 2018/0117728 | A1 * | 5/2018 | Kawakami | B25F 5/008 |
| 2018/0131058 | A1 * | 5/2018 | Wang | H01M 50/213 |
| 2018/0317348 | A1 * | 11/2018 | Taga | H02J 7/0042 |
| 2019/0039228 | A1 * | 2/2019 | Matsushita | B25F 5/00 |
| 2020/0023506 | A1 * | 1/2020 | Justis | B25F 5/00 |
| 2020/0052559 | A1 * | 2/2020 | Matsushita | H02K 21/16 |
| 2020/0245835 | A1 * | 8/2020 | Iwakami | A47L 9/22 |
| 2020/0331138 | A1 * | 10/2020 | Ejiri | B24B 23/02 |
| 2021/0162525 | A1 * | 6/2021 | Aoki | B26D 7/2614 |
| 2021/0234431 | A1 * | 7/2021 | Momiyama | H02K 11/33 |
| 2022/0034047 | A1 * | 2/2022 | Berenz | E01C 19/26 |
| 2022/0152767 | A1 * | 5/2022 | Huber | B23Q 11/0071 |
| 2022/0193871 | A1 * | 6/2022 | Friedman | H02P 6/157 |
| 2022/0193879 | A1 * | 6/2022 | Almqvist | B25F 5/006 |
| 2022/0226974 | A1 * | 7/2022 | Liu | B25B 23/1475 |
| 2022/0263377 | A1 * | 8/2022 | Sasaki | H02K 7/116 |
| 2022/0314422 | A1 * | 10/2022 | Karlsson | H01M 50/244 |
| 2023/0079761 | A1 * | 3/2023 | Mizutani | B25F 5/02 173/217 |
| 2023/0241696 | A1 * | 8/2023 | Wang | B24B 55/02 83/169 |
| 2024/0157523 | A1 * | 5/2024 | Barezzani | B25F 5/008 |
| 2025/0018548 | A1 * | 1/2025 | Liu | H02K 5/207 |

FOREIGN PATENT DOCUMENTS

| | | | | |
|---|---|---|---|---|
| EP | 3778133 | A1 | 2/2021 | |
| EP | 3854533 | A1 | 7/2021 | |
| JP | 2009-018359 | A | 1/2009 | |
| JP | 2021-030313 | A | 3/2021 | |
| JP | 2021-030314 | A | 3/2021 | |
| JP | 2021187061 | A * | 12/2021 | |
| JP | 2024111932 | A * | 8/2024 | H02K 3/522 |
| WO | WO-2014126017 | A1 * | 8/2014 | A01D 34/90 |
| WO | WO-2016087341 | A1 * | 6/2016 | B25D 11/00 |
| WO | 2016-152382 | A1 | 9/2016 | |

OTHER PUBLICATIONS

Office Action issued in the corresponding Japanese Patent Application No. 2022-006797; mailed on Apr. 22, 2025 (total 10 pages).

* cited by examiner

POWER WORKING MACHINE

CROSS REFERENCE TO RELATED APPLICATIONS

The present application claims priority under 35 U.S.C. § 119 to Japanese Patent Application No. 2022-6797, filed Jan. 20, 2022, the contents of which are incorporated herein by reference in their entirety.

BACKGROUND

Technical Field

The present invention relates to a power working machine.

Related Art

JP 2021-30313 A discloses a technology for a chain saw in which a motor is installed in a cooling route inside a main body case, in which an intake port leading to the cooling route opens to the main body case.

In the technology disclosed in JP 2021-30313 A, since air is drawn in from a side surface of the main body case, foreign matter such as shaving generated by working with the chain saw can easily enter inside.

In view of the above circumstances, the present invention provides a technology to make it difficult for foreign matter to be drawn in through the intake port.

(1) According to an aspect of the present invention, a power working machine is provided. The power working machine comprises a working portion, a driving portion, a main body portion, and a blowing portion. The working portion is configured to act on a work object. The driving portion is configured to drive the working portion. The main body portion includes a bottom surface portion, an intake port, and an exhaust port, and is configured to form a storage space for storing the driving portion and an airflow path leading from the intake port to the exhaust port through the storage space. The blowing portion is configured to generate an airflow in the airflow path toward the exhaust port. The intake port is configured to open in a direction having a vertical downward component in a first state in which the power working machine is placed with the bottom surface portion facing a horizontal surface.

According to such an aspect, it is possible to make it difficult for foreign matter to be drawn in through the intake port.

DETAILED DESCRIPTION

Hereinafter, embodiments of the present invention will be described with reference to drawings. Various features described in the embodiment below can be combined with each other.

Embodiment

In the present embodiment, a chain saw for cutting a tree, a board, etc. will be described as an example of an electric working machine according to the present invention.

Figure 1:
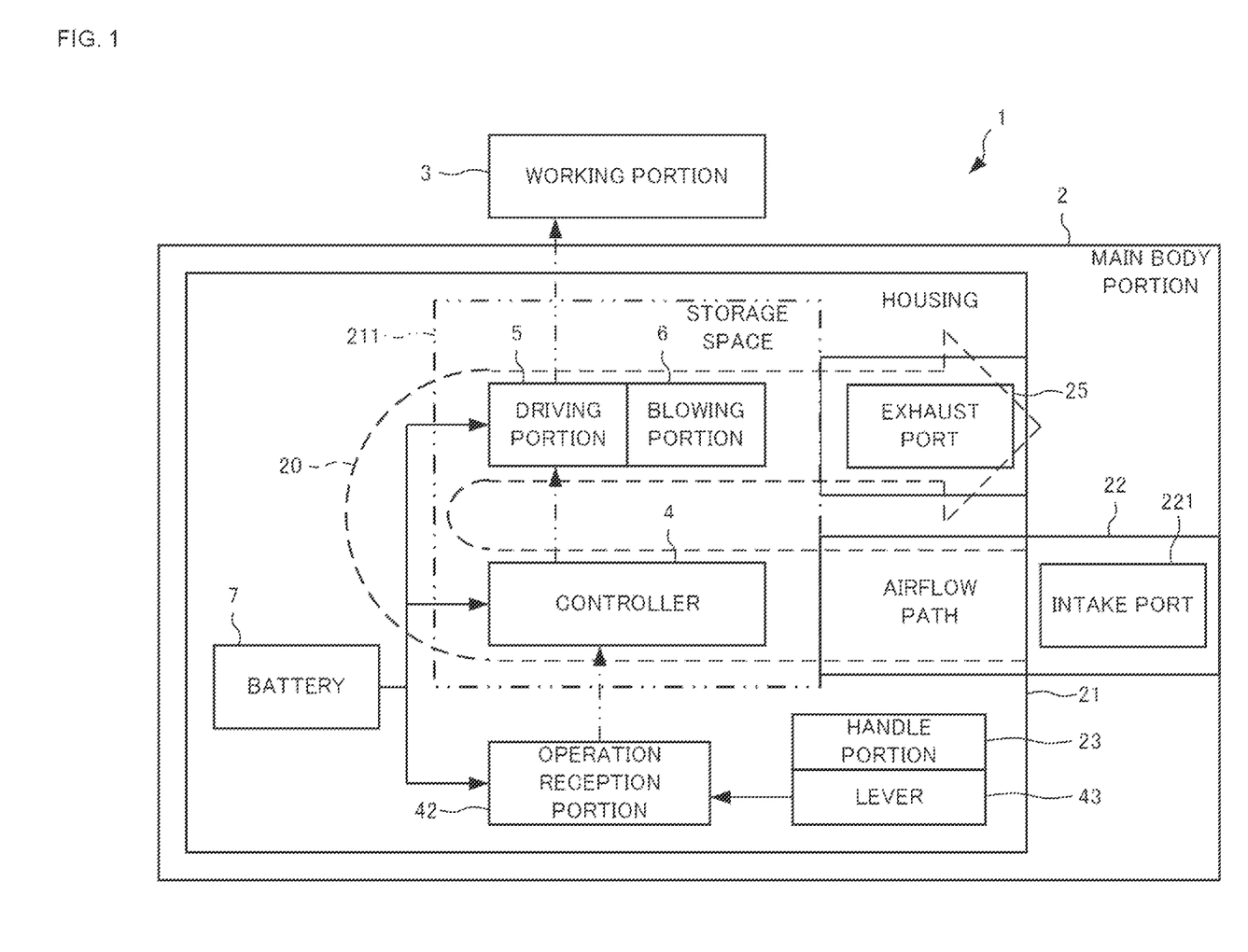
FIG. 1 is a block diagram showing an overall configuration of a chain saw 1.

FIG. 1 is a block diagram showing an overall configuration of a chain saw 1. The chain saw 1 comprises a main body portion 2, a working portion 3, a controller 4, a driving portion 5, a blowing portion 6, and a battery 7. The main body portion 2 includes a housing 21 and an intake 22. The housing 21 is a box-shaped portion that holds other portions. The housing 21 stores the controller 4, the driving portion 5, and the blowing portion 6 in a storage space 211 provided inside and stores and holds an operation reception portion 42. The housing 21 allows the working portion 3 to expose to outside, and detachably holds the battery 7.

The housing 21 forms therein an airflow path 20 through which cooling air for cooling the controller 4 and the driving portion 5 (in particular, a motor) flows. The intake 22 is attached to the housing 21 and forms an intake port 221 side in the airflow path 20. The housing 21 includes a handle portion 23. The handle portion 23 is a handle portion that an operator grips when working with the chain saw 1, and includes a lever 43. When the operator holding the handle portion 23 operates the lever 43, the operation reception portion 42 transmits an ON signal to the controller 4. When the operator works with the chain saw 1, the working portion 3 contacts a work object and directly acts on the work object. In the present embodiment, the work object is a tree and a board, etc., and the working portion 3 acts to cut these objects.

The controller 4, the driving portion 5, and the operation reception portion 42 are all operate by electric power supplied from the battery 7. The operation reception portion 42 is provided at an inside of the housing 21 on a handle portion 23 side, and receives an operation of the operator by the operator operates the lever 43. The controller 4 controls an operation of the driving portion 5 based on a signal transmitted from the operation reception portion 42 by the operator performs an operation of gripping the lever 43. Further, the controller 4 is provided on a control board and further comprises an IC circuit (Integrated Circuit) or the like to generate and transmit a control signal, etc. The driving portion 5 includes a motor and a sprocket, etc., and allows the motor to rotate by switching an inverter (not shown) based on a drive signal from the controller 4 to drive the working portion 3.

The blowing portion 6 is a fan, which is attached to the motor provided in the airflow path 20 described above, and the fan rotates as the motor rotates to generate airflow that cools a heat-generating component (controller 4 or driving portion 5), etc. that generate heat when driving the chain saw 1. The cooling air, for example, is drawn in from the intake port 221 of the intake 22 attached to the main body portion 2, passes through the airflow path 20 on an inlet side, cools the heat-generating component stored in the storage space 211, and is discharged from an exhaust port 25.

Figure 2:
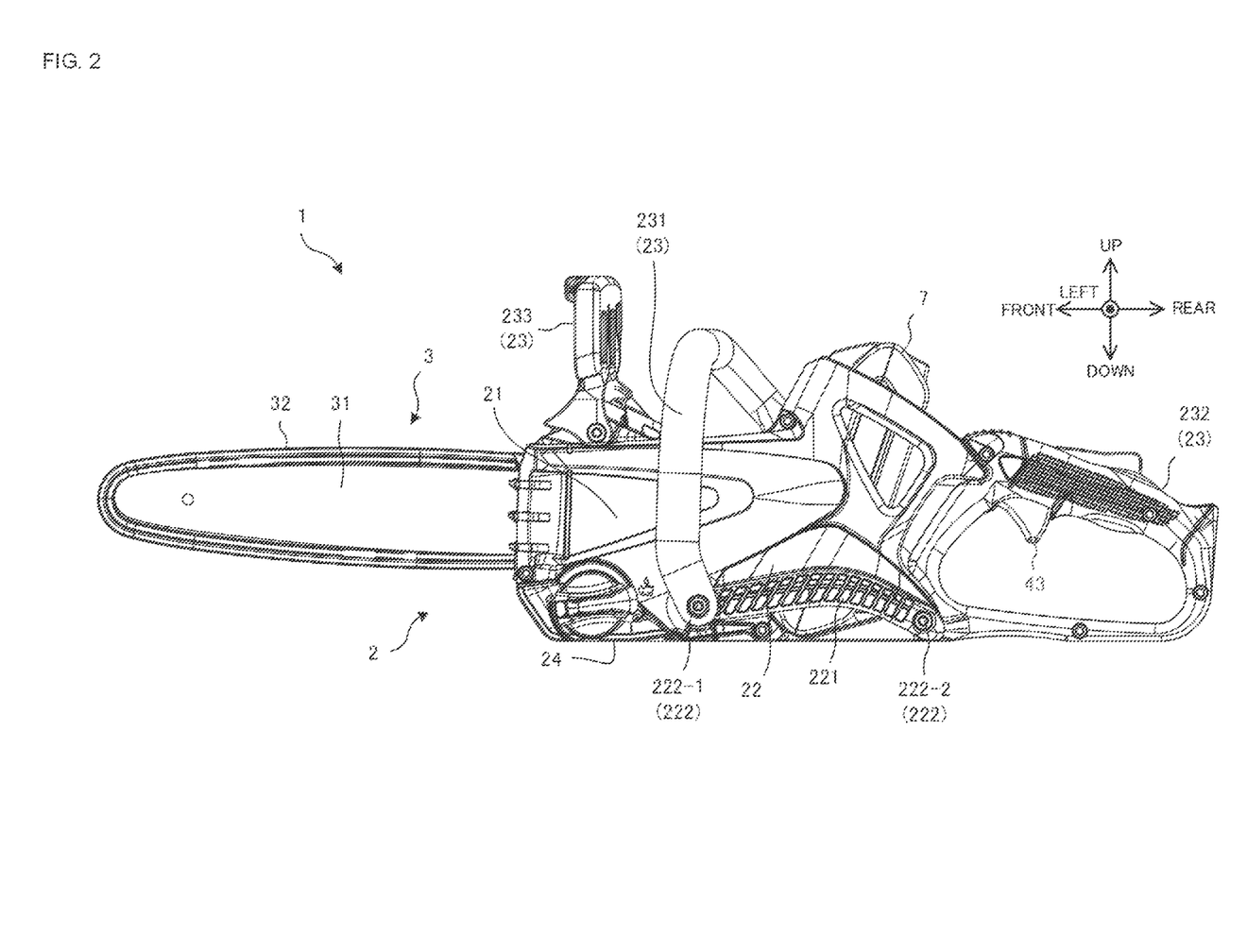
FIG. 2 is a diagram showing an appearance of the chain saw 1.

FIG. 2 is a diagram showing an appearance of the chain saw 1. In FIG. 2, the chain saw 1 viewed from left is shown. In the chain saw 1, an up-down direction, a front-back direction, and a left-right direction are defined as shown in FIG. 2. In the present embodiment, the up-down direction of the chain saw 1 is defined as a vertical direction when the chain saw 1 is placed on a flat and horizontal installation surface. The front-back direction is defined as a direction orthogonal to the up-down direction, and the left-right direction is defined as a direction orthogonal to the up-down direction and the front-back direction. The front-back direction and the left-right direction will be described in detail later.

The main body portion 2, the working portion 3, and the battery 7 are shown in FIG. 2. The working portion 3 comprises a guide bar 31 and a saw chain 32. The guide bar 31 is a plate-shaped member that extends along the front-back direction, and a rear end portion of the guide bar 31 is attached to the main body portion 2. The annular saw chain 32 is wound around a periphery of the guide bar 31. The saw chain 32 is engaged with a drive gear of the driving portion 5 shown in FIG. 1.

The drive gear is driven by the motor of the driving portion 5 and rotates. The controller 4 shown in FIG. 1 executes a control process to control rotation of the motor when the lever 43 is operated by the operator. The battery 7 has an elongated shape and is inserted into and held with respect to the main body portion 2 so as to supply power to the controller 4 and the driving portion 5, etc. With the above configuration, when the operator operates the lever 43, the motor controlled by the controller 4 rotates the sprocket, and such a rotational power allows the saw chain 32 to rotate along the periphery of the guide bar 31.

In FIG. 2, the housing 21, the intake 22, the handle portion 23, and a bottom surface portion 24 of the main body portion 2 are shown. The bottom surface portion 24 is a part that contacts an installation surface when the chain saw 1 is placed on the flat installation surface. Although the bottom surface portion 24 includes a flat surface in contact with the installation surface in the present embodiment, the bottom surface portion 24 can also be shaped to be in contact with the installation surface at a plurality of sides or points, as long as the chain saw 1 is stable when placed on the installation surface. Hereafter, a state in which the chain saw 1 is placed with the bottom surface portion 24 facing a horizontal surface is referred to as a horizontal installation state. The horizontal installation state is an example of a "first state" of the present invention. In the horizontal installation state, the up-down direction of the chain saw 1 is aligned with the vertical direction.

The intake 22 includes an intake port 221 and forms an inlet side of the airflow path formed inside the main body portion 2, i.e., an intake port 221 side. The airflow path formed by the intake 22 and the airflow path formed by the housing 21 are connected inside the main body portion 2, and an airflow path is formed from an inlet (intake port 221) to an outlet (exhaust port described later). In the airflow path, the controller 4 and the motor, etc. of the driving portion 5 are arranged in the storage space 211 shown in FIG. 1 and are cooled by the cooling air drawn in from the intake port 221.

Further, the intake 22 includes a front fixing portion 222-1 and a rear fixing portion 222-2 (each of which is referred to as "fixing portion 222" when not distinguished). The fixing portion 222 is a hole for screwing in a screw or the like to fix the intake 22 to the housing 21. The fixing portion 222-1 also serves as a fixing portion for fixing the handle portion 23 to the housing 21. In this manner, the intake 22 is attachable to and detachable from the housing 21.

The handle portion 23 includes a front handle 231, a rear handle 232, and a hand guard 233. The front handle 231 is provided on a front side of the main body portion 2, and the rear handle 232 is provided on a rear side of the main body portion 2. Both the front handle 231 and the rear handle 232 are parts that are gripped (grasped and held) by an operator when performing an electric work. The operator operates the lever 43 while gripping the rear handle 232 to perform a work, regardless of the direction in which the work object is cut. The hand guard 233 is a part that protects a hand gripping the front handle 231 from a branch or the like. The hand guard 233 may also serve as a brake lever to stop the driving portion 5.

As described above, when the operator grips the front handle 231 and the rear handle 232 to lift the chain saw 1, and allows the saw chain 32 to rotate, thereby performing work on a work object such as a tree. In the chain saw 1, a working portion 3 side where the work is performed on the work object is defined as a front side and a main body portion 2 side that is gripped by the operator during work is defined as a rear side, and directions pointing to the front side and the rear side are defined as the front-back direction. In addition, leftward and rightward directions when looking forward from the rear side are defined as the left-right direction.

Figure 3:
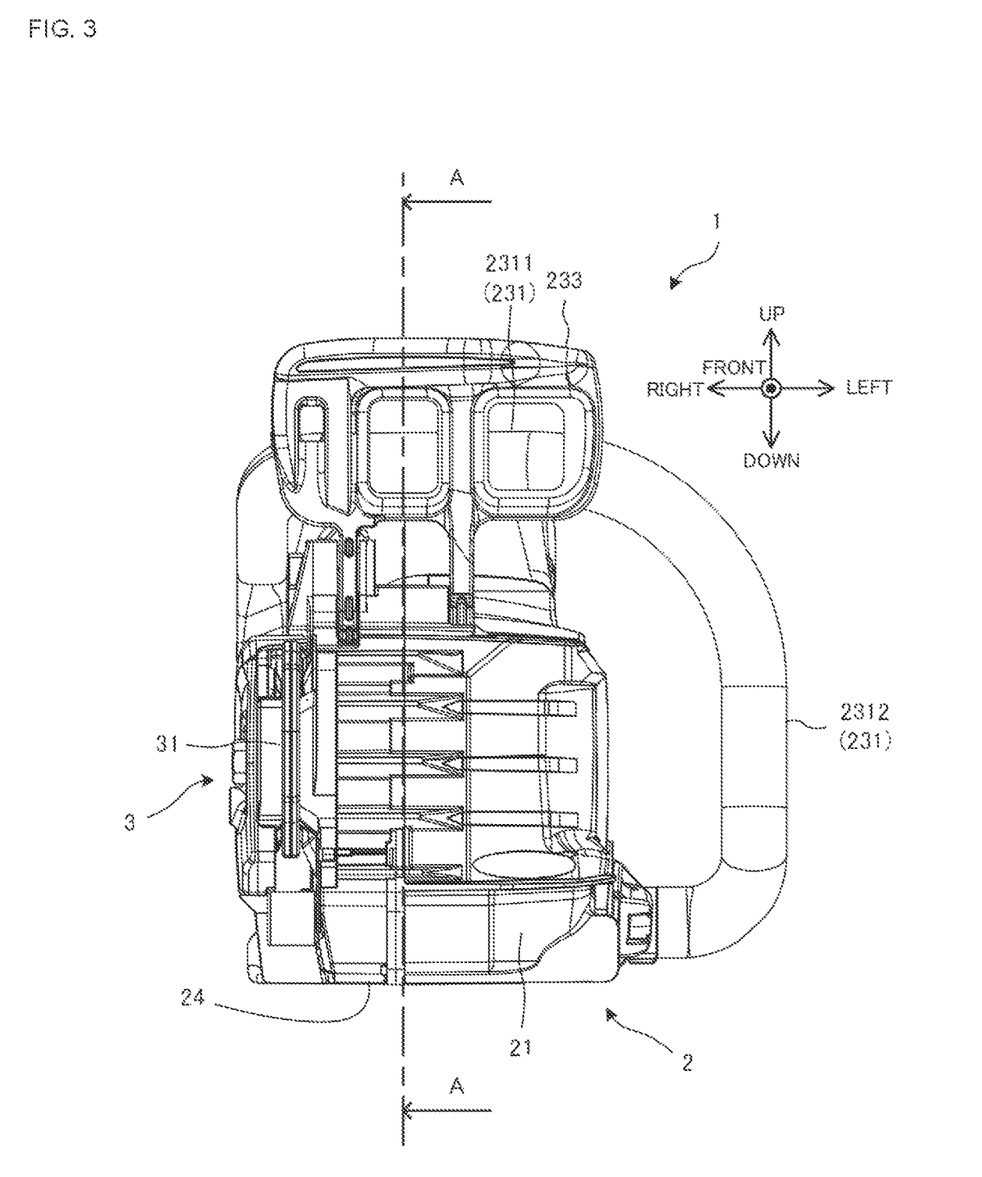
FIG. 3 is a diagram showing the chain saw 1 viewed from front.

FIG. 3 is a diagram showing the chain saw 1 viewed from front. As shown in FIG. 3, the front handle 231 includes a first handle portion 2311 and a second handle portion 2312. The first handle portion 2311 is provided in an upper direction of the housing 21 and separated from the housing 21, and the second handle portion 2312 is provided in a left direction of the housing 21 and separated from the housing 21. The operator alternately holds the first handle portion 2311 and the second handle portion 2312 depending on whether the work object is to be cut vertically or horizontally.

When cutting the work object vertically, the operator grips the first handle portion 2311 with one hand, grips the rear handle 232 with the other hand, and operates the operation reception portion 42 to allow the saw chain 32 to rotate vertically. When cutting the work object horizontally, the operator grips the second handle portion 2312 with one hand, grips the rear handle 232 with the other hand to keep a posture of the chain saw 1 tilted sideways, and operates the operation reception portion 42 to allow the saw chain 32 to rotate sideways.

Figure 4:
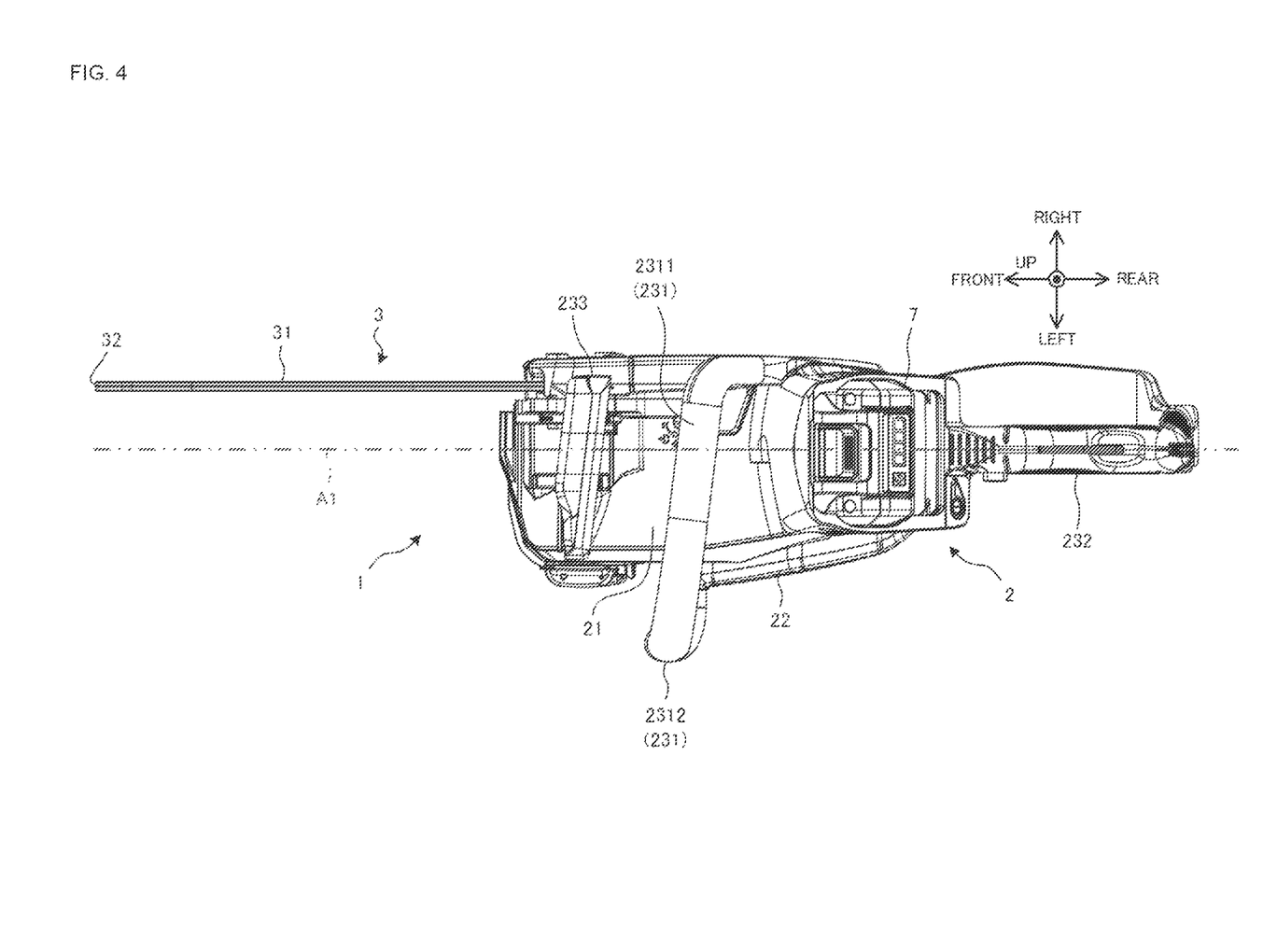
FIG. 4 is a diagram showing the chain saw 1 viewed from above.

FIG. 4 is a diagram showing the chain saw 1 viewed from above. In FIG. 4, a center line A1, which indicates a center of the rear handle 232 in the left-right direction, is shown as a double-dashed line. The intake 22 is provided on a leftward side surface of the housing 21. The side surface is a left end of the housing 21, and is positioned on left side of the center (center line A1) of the rear handle 232 in the left-right direction. In other words, the intake 22 is positioned on a left side of the center of the rear handle 232 in the left-right direction. On the other hand, the working portion 3 is provided on a right side of the center of the rear handle 232 in the left-right direction.

Figure 5:
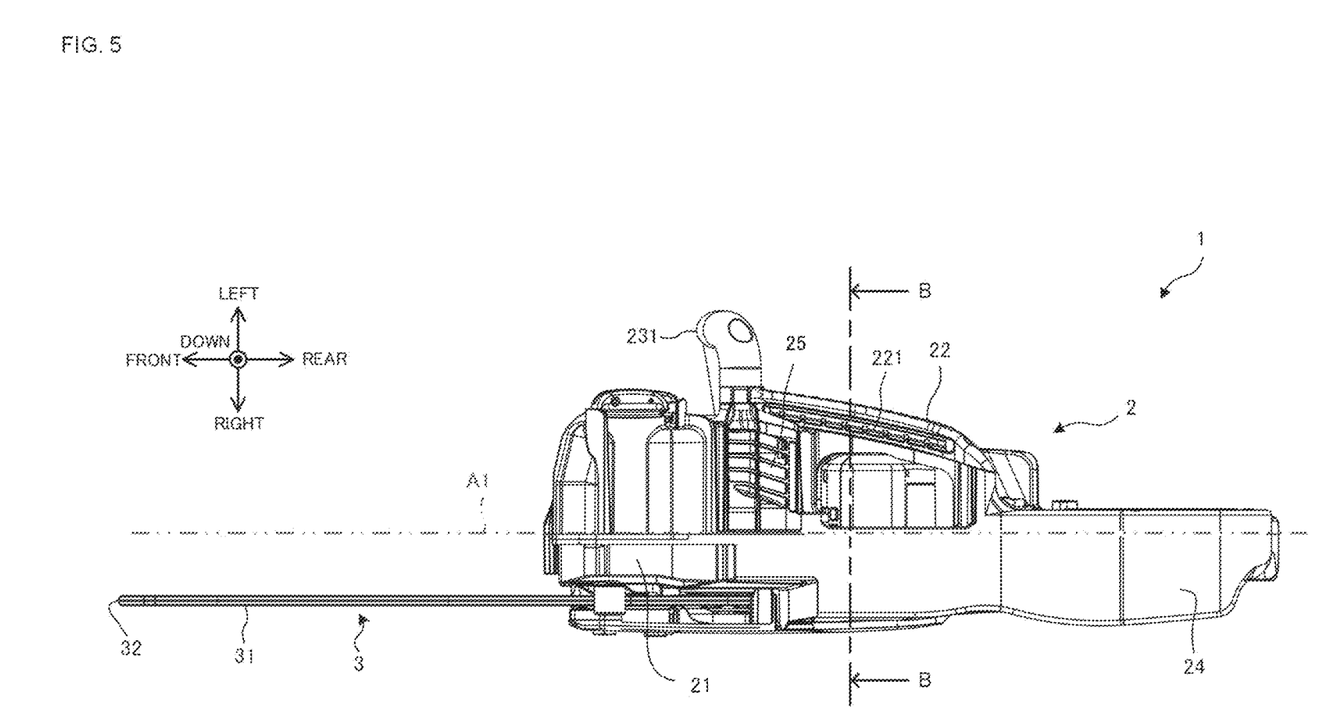
FIG. 5 is a diagram showing the chain saw 1 viewed from below.

FIG. 5 is a diagram showing the chain saw 1 viewed from below. In FIG. 5, the center line A1, which indicates the center of the rear handle 232 in the left-right direction, also shown as a double-dashed line. As described above, the working portion 3 is provided on the right side of the center of the rear handle 232 in the left-right direction. More specifically, the saw chain 32 and guide bar 31 included in the working portion 3 are provided on the right side of the center of the rear handle 232 in the left-right direction. On the other hand, the intake port 221 included in the intake 22 is provided on the left side of the center of the rear handle 232 in the left-right direction, similarly to the intake 22.

The working portion 3 may be provided on the left side of the center line A1, in which case the intake port 221 may be provided on the right side of the center line A1. In short, the working portion 3 may be provided on the right side or the left side of the center of the rear handle 232 in the left-right direction, and the intake port 221 may be provided on an opposite side of the working portion 3 from the center of the rear handle 232 in the left-right direction. According to such a configuration, compared to the case where both the working portion 3 and the intake port 221 are provided on the right side or the left side, it is possible to prevent foreign matter such as a chip from being drawn in from the intake port 221.

The housing 21 includes an exhaust port 25 that opens downward. The exhaust port 25 is an outlet discharging the cooling air that is taken in from the intake port 221 and has cooled a heat-generating component such as the motor of the driving portion 5 arranged inside the main body portion 2 through the airflow path 20 formed inside the housing 21 to outside.

The exhaust port 25 is provided between the working portion 3 and the intake port 221. According to such a configuration, foreign matter such as a chip generated during work can be kept away from the intake port 221 by the air discharged from the exhaust port 25, thus inflow into the intake port 221 can be suppressed. Furthermore, by setting a direction in which the air discharged from the exhaust port 25 is discharged to a direction including a component in the left-right direction from the exhaust port 25 toward the working portion 3 (rightward direction in FIG. 5), foreign matter such as chip can be pushed back to the working portion 3 side by the exhausted air, in such a manner that the foreign matter is less likely to enter the intake port 221.

Figure 6:
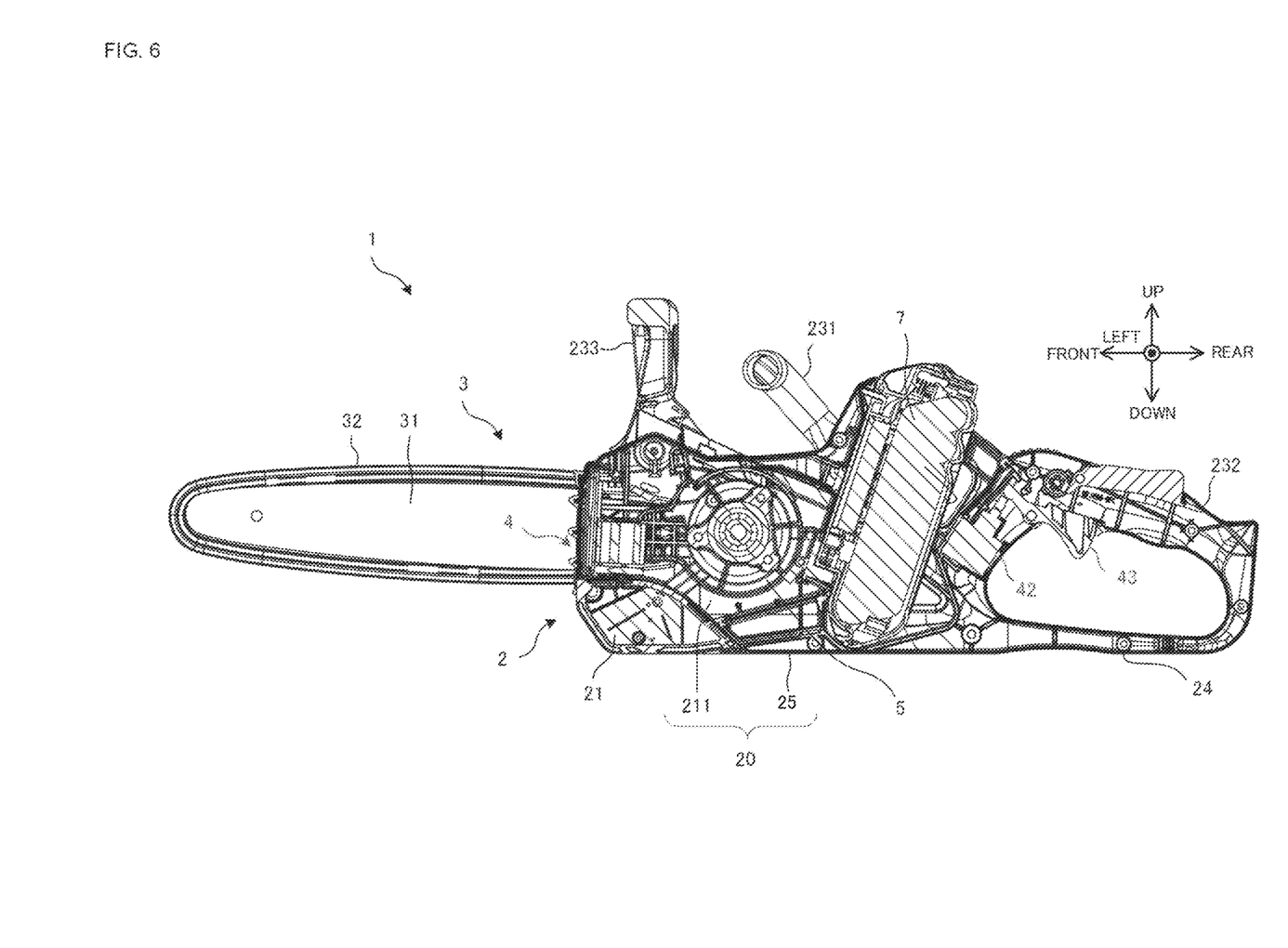
FIG. 6 is an AA arrow view shown in FIG. 3.

FIG. 6 is an AA arrow view shown in FIG. 3. As shown in FIG. 6, the housing 21 of the main body portion 2 includes the storage space 211 storing the driving portion 5. The main body portion 2 forms the airflow path 20 leading from the intake port 221 shown in FIG. 5 to the exhaust port 25 through the storage space 211. The airflow path 20 is provided with a blowing portion 6 shown in FIG. 1. The blowing portion 6 allows an airflow (also called cooling air) to generate in the airflow path 20 toward the exhaust port 25. Shape of the airflow path 20 from the intake port 221 to the storage space 211 will be described with reference to the following figures.

Figure 7:
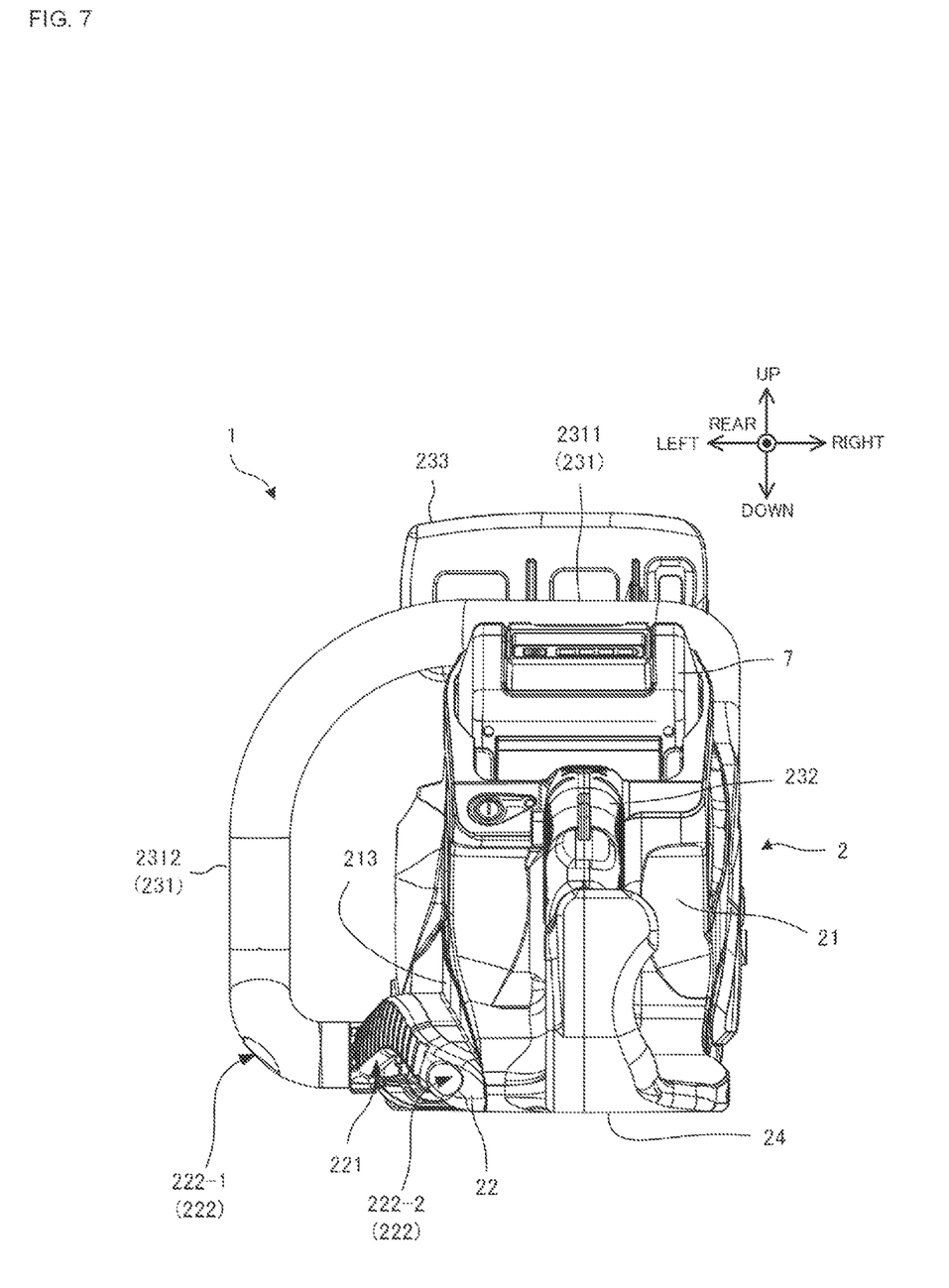
FIG. 7 is a diagram showing the chain saw 1 viewed from rear.

FIG. 7 is a diagram showing the chain saw 1 viewed from rear. As described above, the intake 22 includes the front fixing portion 222-1 and the rear fixing portion 222-2 for fixing the intake 22 to the housing 21. The intake 22 is fixed to a left side surface 213 of the housing 21 by screwing a screw or the like into the fixing portion 222.

Figure 8:
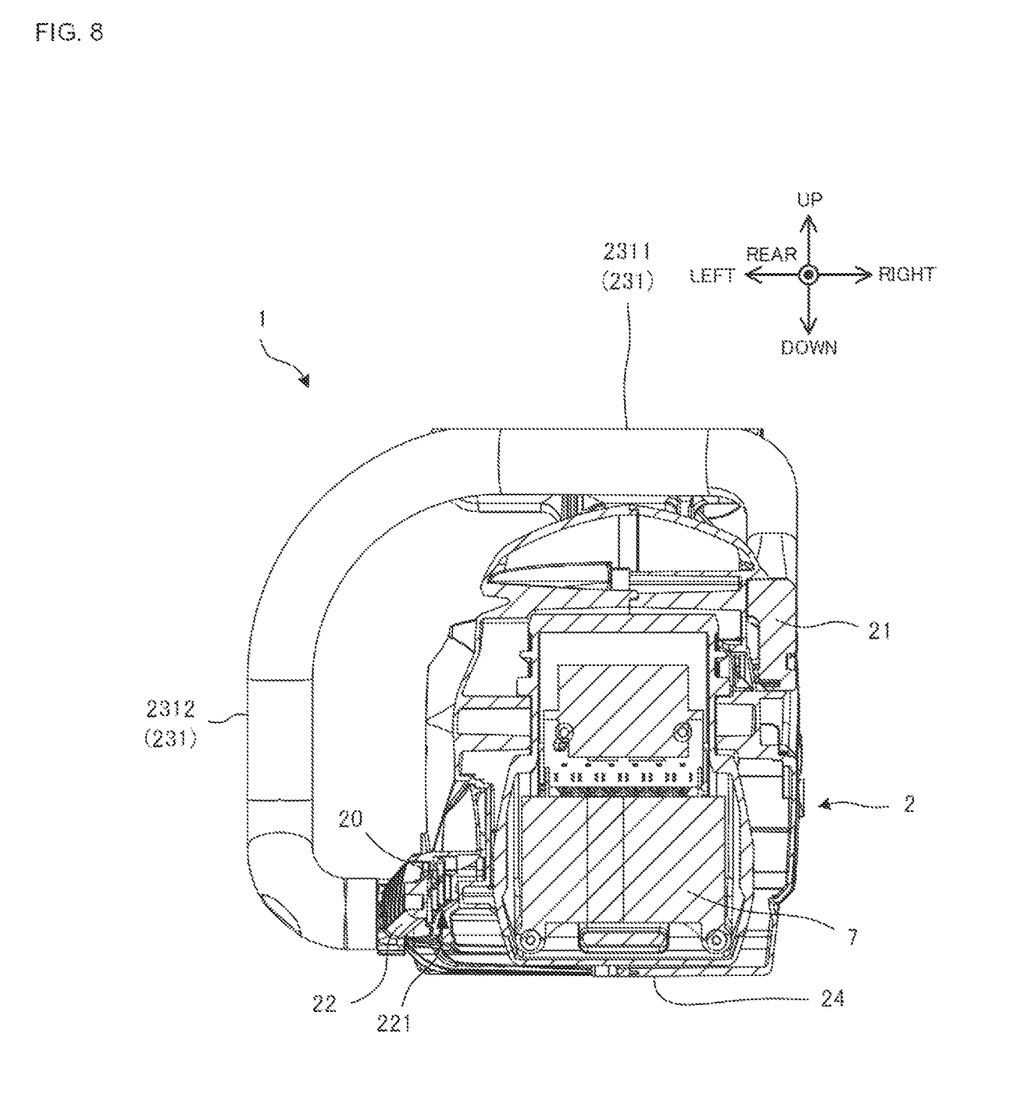
FIG. 8 is an BB arrow view shown in FIG. 5.

FIG. 8 is a BB arrow view shown in FIG. 5. The intake 22 forms the airflow path 20 at end of the intake port 221. Details of the airflow path 20 will be described with reference to FIG. 9.

Figure 9:
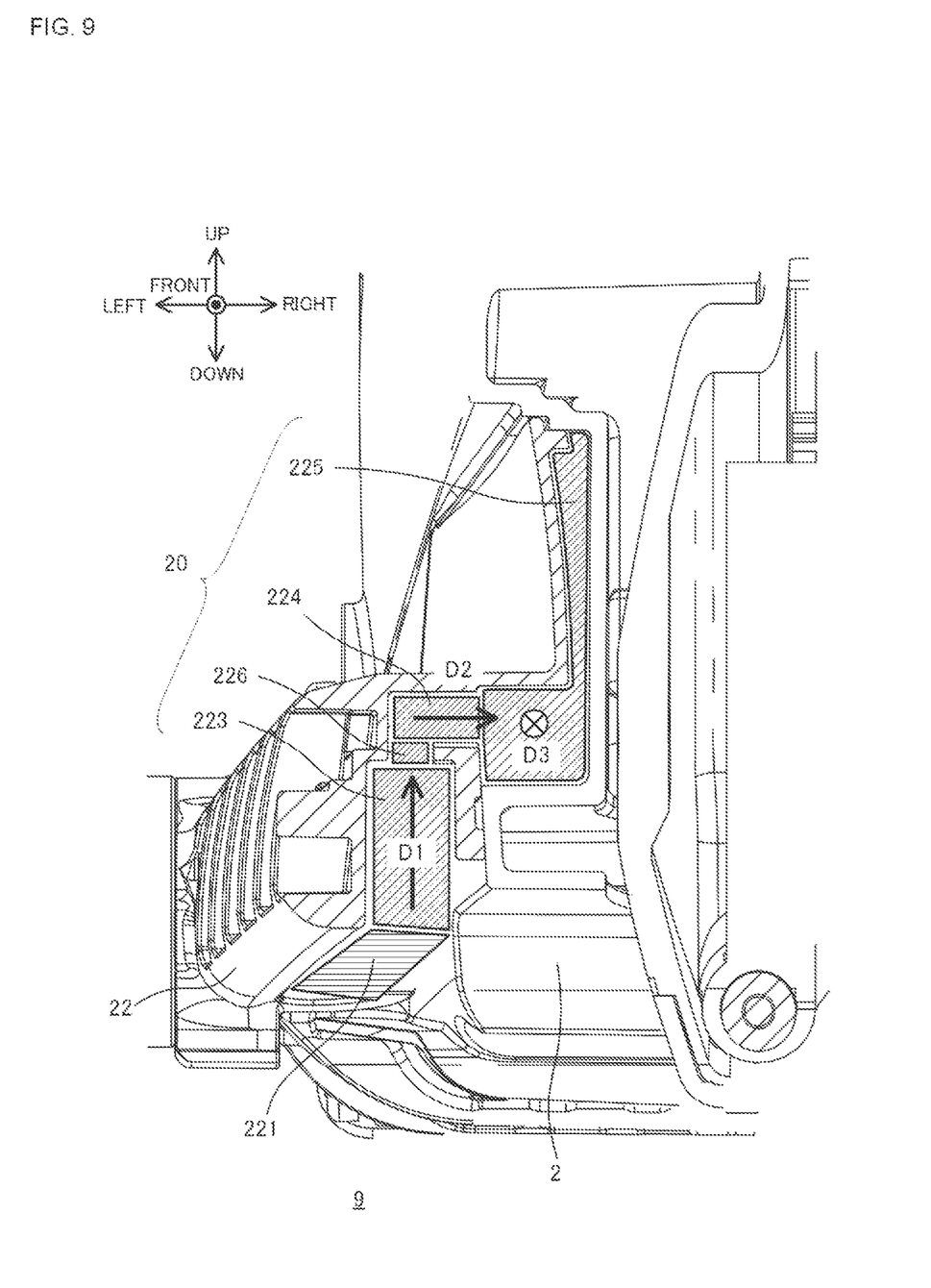
FIG. 9 is an enlarged view of an airflow path 20 shown in FIG. 8.

FIG. 9 is an enlarged view of the airflow path 20 shown in FIG. 8. In FIG. 9, the airflow path 20 is shown hatched for clarity. The airflow path 20 comprises the intake port 221, a first passage 223, a throttling portion 226, a second passage 224, and a third passage 225, starting from the intake port 221 and continuing to depth in this order. The storage space 211 shown in FIG. 6 is connected to depth of the third passage 225.

The intake port 221 of the intake 22 opens in a direction having a vertical downward component in the horizontal installation state described above. When a boundary between an internal space of the intake 22 and the external space 9 is considered as an opening surface, direction of the intake port 221 is more precisely represented by a normal line on an external space 9 side of the opening surface. If the opening surface is one flat surface, direction of the normal line will be uniform, and the direction of the normal line becomes the direction of the intake port 221.

The opening surface may be formed by including two or more flat surfaces or curved surfaces, and in those cases, directions of the normal line are two or more. Even in such cases, for the intake port 221, the two or more normal lines indicating the direction of the intake port 221 may all in a direction including a vertical downward component. Further, the intake port 221 may include a vertically downward component in a vector obtained by synthesizing unit vectors respectively indicating the two or more normal lines. With such a configuration, compared to the case where when the intake port 221 is horizontally installed, for instance, the intake port 221 opens horizontally, it is possible to prevent foreign matter such as chip from being drawn in from the intake port 221.

In the horizontal installation state, the first passage 223 extends from the intake port 221 in a first direction D1 including a vertically upward component. In contrast, the second passage 224 connects to the first passage 223 and extends in a second direction D2 forming a predetermined angle with the first direction D1. The angle formed by the two directions here refers to an angle formed by vectors when starting points of the vectors respectively indicating the two directions are aligned. In the present embodiment, the first direction D1 is an upward direction and the second direction D2 is a rightward direction. Therefore, the predetermined angle formed by the first direction D1 and the second direction D2 is 90 degrees.

If the direction during work is close to the horizontal installation state, even if a foreign matter enters the intake port 221, the foreign matter will have to ascend further into the first passage 223, thus will be less likely to enter depth. However, depending on the work situation, the chain saw 1 may tilt and an upward slope of the first passage 223 may decrease, making it easier for the foreign matter to enter the depth. Even in such a case, if the second direction D2 approaches upward this time, the foreign matter is less likely to enter the depth of the second passage 224. Therefore, according to the present embodiment, when the direction of the chain saw 1 is changed during work, it is difficult for foreign matter to enter the depth of the airflow path 20.

The predetermined angle formed by the first direction D1 and the second direction D2 may be less than 90 degrees or greater than 90 degrees. However, if the predetermined angle is too small, foreign matter that enters the first passage 223 can easily enter the second passage 224 as it is. On the other hand, if the predetermined angle is too large, a resistance to generate airflow in the airflow path 20 will increase and power consumption of the blowing portion 6 will increase. Therefore, the predetermined angle should be around 90 degrees.

The third passage 225 connects to the second passage 224 and extends in a third direction D3 forming a determined angle with the first direction D1 and the second direction D2, respectively. In the present embodiment, the third direction D3 is a forward direction. Therefore, the angles formed by the first direction D1, the second direction D2, and the third direction D3 are all 90 degrees. As a result, as in the case of the second passage 224, it is possible to prevent foreign matter from entering the depth of the airflow path 20 when the direction of the chain saw 1 is changed during work.

The throttling portion 226 is provided in the airflow path 20 and is a portion having a reduced cross-sectional area compared to the front and rear airflow paths 20. In the present embodiment, the throttling portion 226 is provided between the first passage 223 and the second passage 224, and has a reduced cross-sectional area compared to the front and rear airflow paths 20 (the first passage 223 and the second passage 224). With such a configuration, foreign matter that has entered from the intake port 221 is easily caught by the throttling portion 226, thus it is possible to prevent foreign matter from entering the throttling portion 226 first.

Other Embodiments

In the embodiment, although a chain saw is described as an example of a power working machine, it is not limited thereto. For instance, the electric working machine may be a hedge trimmer or an engine cutter. Further, although the chain saw is described as a power-driven working machine in which the driving portion 5 includes a motor, the chain saw may be a working machine in which the driving portion 5 includes an internal combustion engine. In short, any power working machine may be applied as long as it comprises a driving portion that requires cooling inside the main body portion.

In the embodiment, the throttling portion 226 is provided in the airflow path 20, but in addition to or instead of the throttling portion 226, a filter may be provided. In those cases, foreign matter can still be prevented from entering through the filter first. Further, the filter may be provided in the throttling portion 226. In this case, since the cross-sectional area of an installation location of the filter is smaller than other locations, air resistance caused by the filter is smaller than when the filter is provided in other locations, and energy consumption of the blowing portion 6 can be suppressed.

The filter may be provided in the first passage 223, the second passage 224 or the third passage 225. Further, the filter may be provided in the airflow path 20 inside the housing 21. However, it is preferable that the filter be provided in the intake 22. The intake 22 is a part of the main body portion 2, but the intake 22 is attachable to and detachable from the housing 21. The intake 22 forms at least the airflow path 20 from the intake port 221 to the filter, thus the filter can be replaced more easily than when the filter is provided inside the housing 21.

Shape of the airflow path 20 is not limited to the description in the embodiment. For instance, in the embodiment, the second direction D2 in which the second passage 224 extends is a rightward direction, but the second direction D2 may be a leftward direction as well. Moreover, although the third direction D3 in which the third passage 225 extends is a forward direction, the third direction D3 may be a backward direction as well. In either case, if the direction of the chain saw 1 changes during work and an upward slope of the first passage 223 decreases, the other passages will have an upward slope, making it easier to suppress entry of foreign matter.

After the second passage 224 extending in the rightward second direction D2, a fourth passage extending in an opposite leftward fourth direction may be provided. With such a configuration, even if the chain saw 1 is inclined to right or left, either the second passage 224 or the fourth passage has an upward slope, hence making it easier to suppress entry of foreign matter.

The handle portion 23 is arranged in such a manner that it is easy to grip in accordance with the direction of the chain saw 1. Therefore, the airflow path 20 may be formed in accordance with the arrangement of the handle portion 23. For example, as in the embodiment, the chain saw 1 includes a first handle portion 2311 and a second handle portion 2312.

As described above, the state in which the operator grips the first handle portion 2311 for work is a state in which the saw chain 32 rotates vertically and is hereinafter referred to as "vertical rotation state". More specifically, the vertical rotation state refers to a state that the chain saw 1 maintains when only the first handle portion 2311 is supported. The chain saw 1 is designed in such a manner that the front-back direction is nearly horizontal when only the first handle portion 2311 is supported in such a manner that the operator can easily work. However, it is not always completely horizontal, for instance, there are cases where the front is slightly upward and raise forward. Therefore, the vertical rotation state may or may not match the horizontal installation state described in the embodiment.

On the other hand, the state in which the operator grips the second handle portion 2312 for work is a state in which the saw chain 32 rotates horizontally as described above and is hereinafter referred to as "horizontal rotation state". More specifically, the horizontal rotation state refers to a state that the chain saw 1 maintains when only the second handle portion 2312 is supported. The vertically rotation state is an example of "first gripping state" of the present invention, and the horizontal rotation state is an example of "second gripping state" of the present invention.

The first passage 223 may be provided to extend in the second direction including a vertical upward component from the intake port 221 in the vertical rotation state (first gripping state), and the second passage 224 may be provided to extend in the third direction including a vertical upward component in the horizontal rotation state (second gripping state). The second direction coincides with the first direction described above when the vertical rotation state coincides with the horizontal installation state.

According to such a configuration, it is possible to easily prevent foreign matter that has entered the airflow path from entering the depth regardless of which one of the first handle portion 2311 and the second handle portion 2312 is gripped. In short, the "direction including a vertically upward component" may be any direction that is even slightly vertically upward, and the closer the direction is to the vertically upward direction (the angle formed with the horizontal surface is 90 degrees), the easier it is to prevent foreign matter from entering the depth of the airflow path.

APPENDIX

Further, the present invention may be provided with each of the following aspects.

(2) The power working machine, wherein: the main body portion includes a rear handle, the working portion is provided on a right side or a left side from a center of the rear handle in a left-right direction, and the intake port is provided on an opposite side of the working portion from the center.

According to such a configuration, it is possible to prevent foreign matter from being drawn in from the intake port.

(3) The power working machine, wherein: the airflow path includes a first passage extending in a first direction including a vertical upward component from the intake port in the first state, and a second passage connected to the first passage and extending in a second direction at a predetermined angle to the first direction.

According to such a configuration, even if the direction of the power working machine changes during work, it is possible to prevent foreign matter from entering the depth of the airflow path.

(4) The power working machine, wherein: the main body portion includes a first handle portion and a second handle portion, the first passage extends in a direction including a vertical upward component from the intake port in a first gripping state in which the first handle portion is held and worked by an operator, and the second passage extends in a direction including a vertical upward component in a second gripping state in which the second handle portion is held and worked by an operator.

According to such a configuration, regardless of which handle portion is gripped, it is possible to easily prevent foreign matter that have entered the airflow path from further entering the depth.

(5) The power working machine, wherein: the main body portion includes a throttling portion in the airflow path with a reduced cross-sectional area compared to front and rear.

Such a configuration can make it difficult for foreign matter to enter the throttling portion first.

(6) The power working machine, further comprising: a filter provided in the throttling portion.

According to such a configuration, energy consumption of the blowing portion can be suppressed compared to the case where the filter is provided at other position.

(7) The power working machine, wherein: the main body portion is configured to be partially detachable, and the part forms at least the airflow path from the intake port to the filter.

According to such a configuration, filter replacement can be facilitated.

Of course, the above aspects are not limited thereto.

Further, the above-mentioned embodiments and variations may be implemented in any combination.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. A power working machine, comprising:
   a working portion configured to act on a work object;
   a driving portion configured to drive the working portion;
   a main body portion including a bottom surface portion, an intake port, and an exhaust port, the main body portion having a storage space therein for storing the driving portion, a cooling airflow path leading from the intake port to the exhaust port being formed in the storage space; and
   a blowing portion configured to generate a cooling airflow in the cooling airflow path toward the exhaust port, the cooling airflow being configured to cool the driving portion, wherein
   the intake port opens in a direction having a vertical downward component in a first state in which the power working machine is placed with the bottom surface portion downwardly facing a horizontal surface,
   the cooling airflow path is configured with a first passage, a second passage, and a third passage,
   the first passage extends from the intake port in a first direction having a vertically upward component in the first state,
   the second passage is connected to a downstream side of the first passage extends in a second direction, and an angle formed between the first and second directions is a first angle,
   the third passage is connected to a downstream side of the second passage extends in a third direction, and an angle formed between the third direction and each of the first and second directions is a second angle, and
   the blowing portion is provided at a back of a downstream side of the third passage such that the cooling airflow that has passed through the first second, and third passages reaches the blowing portion.

2. The power working machine according to claim 1, wherein:
   the main body portion includes a rear handle,
   the working portion is provided on a right side or a left side from a center of the rear handle in a left-right direction, and
   the intake port is provided on an opposite side of the working portion from the center.

3. The power working machine according to claim 1, wherein:
   the main body portion includes a first handle portion and a second handle portion,
   the first passage extends in the direction having the vertical upward component from the intake port in a first gripping state in which the first handle portion is held by an operator, and
   the second passage extends in a direction having a vertical upward component in a second gripping state in which the second handle portion is held by the operator.

4. A power working machine comprising:
   a working portion configured to act on a work object;
   a driving portion configured to drive the working portion;
   a main body portion including a bottom surface portion, an intake port, and an exhaust port, the main body portion having a storage space therein for storing the driving portion, a cooling airflow path leading from the intake port to the exhaust port being formed in the storage space; and
   a blowing portion configured to generate a cooling airflow in the cooling airflow path toward the exhaust port, the cooling airflow being configured to cool the driving portion, wherein
   the intake port opens in a direction having a vertical downward component in a first state in which the power working machine is placed with the bottom surface portion downwardly facing a horizontal surface,
   the cooling airflow path is configured with a first passage and a second passage, the first passage extends from the intake port in a first direction having a vertically upward component in the first state,
the second passage is connected to a downstream side of the first passage and extends in a second direction, and an angle formed between the first and second directions is a first angle,
the blowing portion is provided at a back of a downstream side of the second passage such that the cooling airflow that has passed through the first and second passages reaches the blowing portion, and
the main body portion includes a throttling portion in the cooling airflow path with a reduced cross-sectional area that has a smaller area compared to a front side cross-sectional area and a rear side cross-sectional area of the cooling airflow path with respect to the throttling portion.

5. The power working machine according to claim 4, further comprising:
a filter provided in the throttling portion.

6. The power working machine according to claim 5, wherein:
a first part of the main body portion is configured to be attachable to and detachable from the other part of the main body portion, and
the first part forms at least a part of the cooling airflow path from the intake port to the filter.

7. The power working machine according to claim 1, wherein:
the first angle is 90 degrees.

8. The power working machine according to claim 1, wherein:
the second angle is 90 degrees.

* * * * *